United States Patent
Manke, II

(10) Patent No.: US 9,742,143 B2
(45) Date of Patent: Aug. 22, 2017

(54) MODULAR LASER SYSTEM

(71) Applicant: The United States of America as represented by the Secretary of the Navy, Washington, DC (US)

(72) Inventor: Gerald C Manke, II, Bedford, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/231,910

(22) Filed: Aug. 9, 2016

(65) Prior Publication Data

US 2017/0085050 A1 Mar. 23, 2017

Related U.S. Application Data

(62) Division of application No. 14/720,196, filed on May 22, 2015, now Pat. No. 9,425,580.

(60) Provisional application No. 62/159,493, filed on May 11, 2015.

(51) Int. Cl.
| | |
|---|---|
| *H01S 3/04* | (2006.01) |
| *H01S 3/0941* | (2006.01) |
| *H01S 3/23* | (2006.01) |
| *H01S 3/00* | (2006.01) |
| *H01S 3/02* | (2006.01) |

(52) U.S. Cl.
CPC ............. *H01S 3/04* (2013.01); *H01S 3/0071* (2013.01); *H01S 3/0941* (2013.01); *H01S 3/2316* (2013.01); *H01S 3/0057* (2013.01); *H01S 3/0085* (2013.01); *H01S 3/02* (2013.01)

(58) Field of Classification Search
CPC ........ H01S 3/04; H01S 3/0071; H01S 3/0941; H01S 3/2316; H01S 3/0057; H01S 3/02
See application file for complete search history.

(56) References Cited

U.S. PATENT DOCUMENTS 5,136,295 A * 8/1992 Bull .......................... G01S 7/38
342/15
2016/0153751 A1* 6/2016 Hagen ................. F41H 13/0062
398/113

* cited by examiner

*Primary Examiner* — Dung Nguyen
(74) *Attorney, Agent, or Firm* — Christopher A. Monsey

(57) ABSTRACT

Methods and related modular laser systems, e.g., distributed aperture, ultra short pulsed laser, are provided on a host platform having multiple compartments and groups of components where each group has a different environmental sensitivity such as temperature, humidity, vibration, etc or other installation constraints. Each component group is placed in different compartments of the host platform based on constraints comprising equipment, size, available installation footprint, equipment interconnection, and location constraints. For example, one group with one temperature sensitivity falling within environments provided for aircraft passengers or crews can be placed in the crew or passenger compartments. Other components having a greater temperature tolerance might be placed in an equipment bay having a different temperature range than a crew/passenger cabin. Other components might be placed in an area without any environmental controls or even pressurization (e.g., a cargo bay). Components can be located based on single, multiple, or combinations of constraints.

10 Claims, 3 Drawing Sheets

MODULAR LASER SYSTEM

CROSS-REFERENCE TO RELATED APPLICATIONS

The present application claims priority to U.S. patent application Ser. No. 14/720,196, filed May 22, 2015, entitled "MODULAR LASER SYSTEM", which claims priority to U.S. Provisional Patent Application Ser. No. 62/159,493, filed May 11, 2015, entitled "MODULAR, DISTRIBUTED APERTURE, ULTRA SHORT PULSED LASER SYSTEM," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,371) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a modular, distributed aperture, ultra short pulsed laser which produces very short pulses of light for a variety of applications in a new package that minimizes the size, weight, and power needed by a host platform as well as addresses problems associated with variable environmental requirements. It separates various components and subsystems in an optimized and customizable way to best support a wide variety of applications. It is modular and reconfigurable. Existing ultra-short pulse laser systems put all of the components into a single or small handful of packages or sub-packages, which cannot be separated by any significant distance or operate in a variety of environments. Accordingly, existing designs result in large and bulky systems that are often ill suited for various environments, including mobile environments, as well as small enclosures and spaces into which these systems could be used or placed.

According to an illustrative embodiment of the present disclosure, a modular laser system, e.g., distributed aperture, ultra short pulsed laser, is provided on a host platform having multiple compartments and groups of components where each group has a different environmental sensitivity such as temperature, humidity, vibration, etc. Each component group is placed in different compartments of the host platform. Each compartment has a different environment where some compartments are maintained by an environmental control system. For example, one group with one temperature sensitivity that falls within environments provided for aircraft passengers or crews can be placed in the crew or passenger compartments. Other components having a greater temperature tolerance might be placed in an equipment bay that has a temperature range different or broader (e.g. warmer or colder) than one set of compartments, e.g., aircrew or passenger cabin. Other components might be placed in an area without any environmental controls or even pressurization such as a cargo bay or an external pod.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
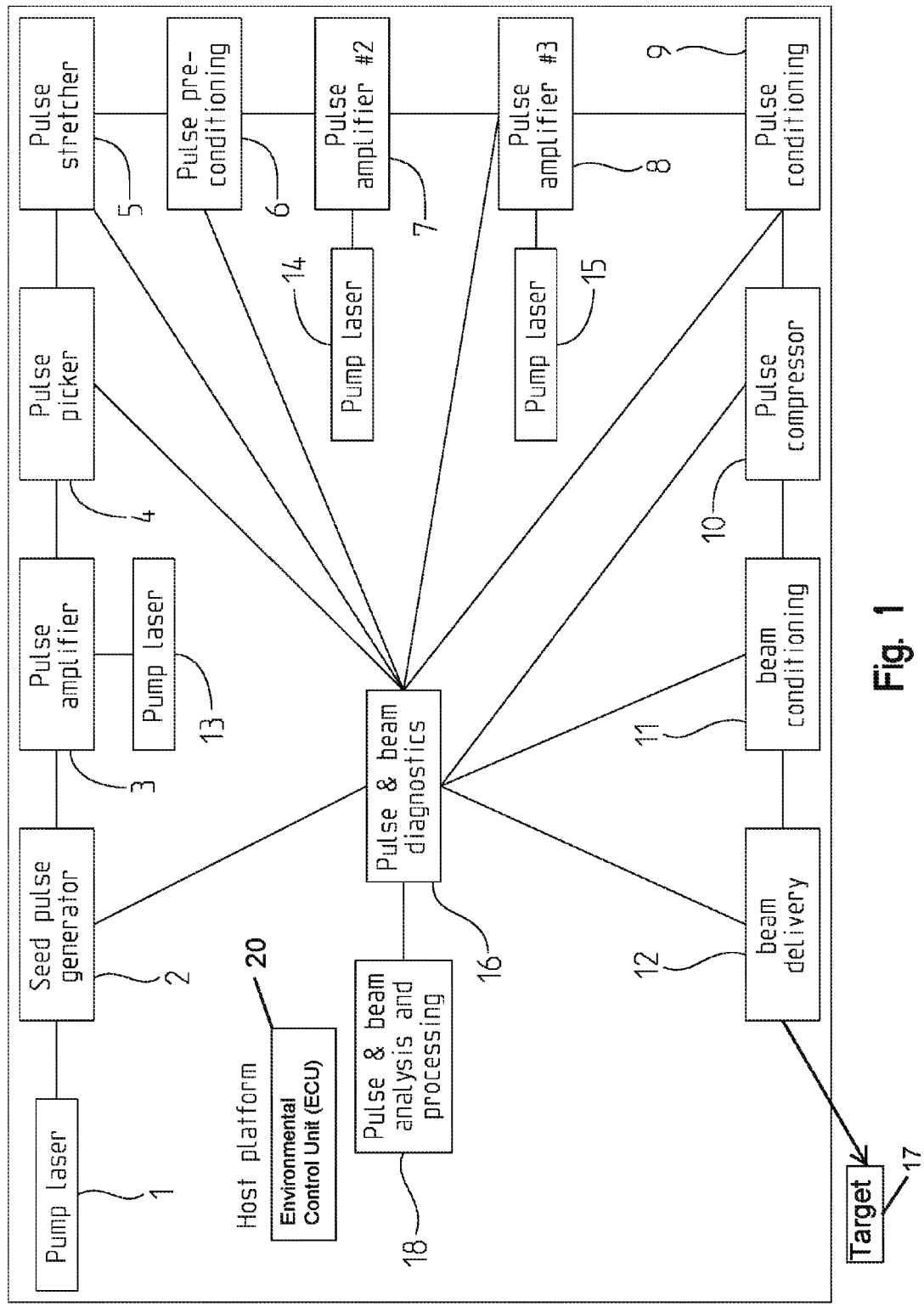
FIG. 1 shows a simplified overview of a laser architecture in in accordance with one embodiment of the invention.

Referring initially to FIG. 1, a layout of an exemplary simplified laser architecture is shown including a pulse laser system going through different pump laser sections to produce a desired beam oriented on a target. FIG. 1 elements can include modular, reconfigurable component variations of a pulse laser system provided on a host platform. modular components must work in a series after being reconfigured and still produce the same result as a traditional ultra-short pump laser. A first pump laser 1 component connected to a seed pulse generator 2. Seed pulse generator 2 is connected to a pulse amplifier 3. Pulse amplifier 3 is connected to a pulse picker 4. The pulse picker 4 connected to a pulse stretcher 5. The pulse stretcher 5 is connected to a pulse pre-conditioning component 6. The pulse pre-conditioning component 6 is connected to a second pulse amplifier 7. The second pulse amplifier 7 is connected to a third pulse amplifier 8. The third pulse amplifier 8 is connected to a pulse conditioning component 9. The pulse conditioning component 9 is connected to a pulse compressor 10. The pulse compressor 10 is connected to a beam conditioning component 11. The beam conditioning component 11 is connected to a beam delivery component 12. The beam delivery component 12 focuses on a target 17. Elements 1-12 also show the path of the laser's travel from the pump laser modular component through a plurality of other modular components and finally reaching the target.

This exemplary configuration's components can be placed on different host platforms and reconfigured based on a desired end application. Modular packaging that is oriented towards a platform application permits tailoring of environmental controls and other subsystem specific components. Diodes are next to fiber, which are next to amplifiers, which are next to beam directors, etc. However, such adjacent design has been discovered as unnecessary and in fact undesirable for a variety of platforms. For example, diodes require significant environmental controls but fiber optic lines do not. Different platforms can be ships, ground vehicles, aircraft, man-portable applications, spacecraft, buildings, large aircraft, small aircraft, or other moving or non-moving ground structures. Different environments and applications/platforms present different requirements for optimizing an overall system which is more than merely the laser system. For example, an existing or legacy laser system might require a large environmental control unit (e.g., a single Environmental Control Unit or Section (ECU/S) 20 conditioning all components for the existing or legacy laser system) as well as power requirements to operate that environmental control unit when most of the laser system does not actually require the same degree of environmental control for the conditions and platform that the laser will be operated within. For example, it is unnecessary to heat or cool a garage to the same temperatures that a residential area of a house requires. By designing modular systems based on the needs of the overall system, platform, and environment, it is possible to reduce energy demand, increase flexibility in design options as also increase a designer's ability to fit a laser system into a particular form or fit envelope. Placement of components in boxes or modules around a platform based on environment and platform/payload compatibility/available footprint/form availability to add boxes or modules into an existing space/availability of existing infrastructure such as electrical power supply and/or electrical bus systems, signal busses, access to external areas required for operation, hardening or ruggedizing of a particular location, etc. For example, a single packaging of a laser system may not fit into a single location of an aircraft which is already climate controlled. Instead, components are placed in locations where they can operate within the aircraft such as diodes would in the aircrew or passenger climate controlled compartment, fibers would be placed outside the crew or passenger cabin where they do not need climate control, electronics may be in an area that has a lower degree of climate control but more than the area where the non-environmentally sensitive components are located in. Additional placement considerations can be used as well associated with constraints arising from equipment, interconnections, size of equipment, requirement input needs (e.g., electrical, cooling interfaces (such as radiators), data bus interfaces, vibration, user requirements, maintenance requirements, interoperability with other systems such as dual use systems that can share components or parts, etc).

Figure 2A:
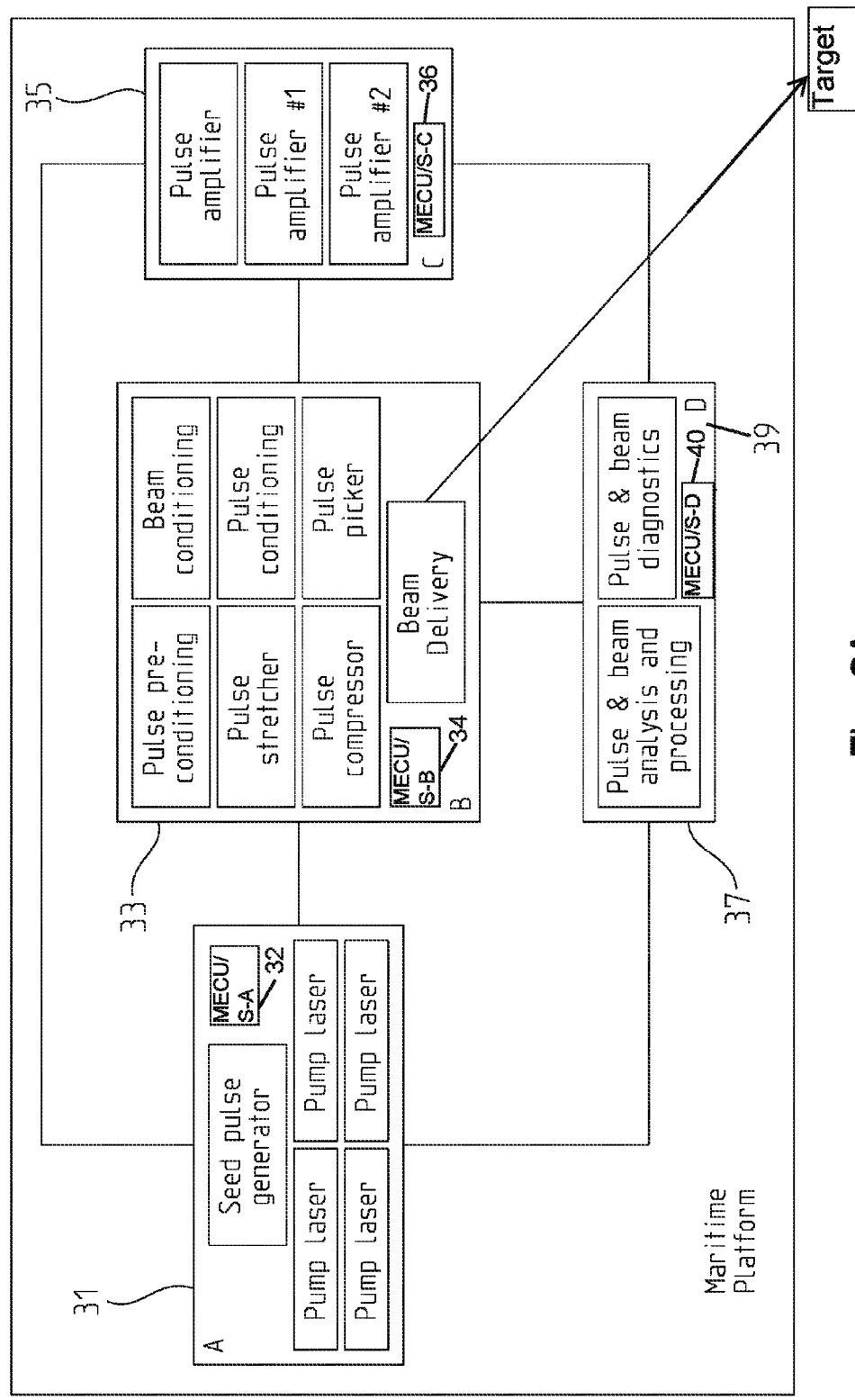
FIG. 2A shows a graphical representation of a first host platform that an embodiment of the invention can be employed within such as a mobile application such as a maritime platform with different compartments.

FIG. 2A shows an example of a maritime host platform in accordance with an embodiment of the invention. In this example, a platform designed for a maritime environment with the various components grouped according to their sensitivity to a maritime environment that tends to be humid (70+% relative humidity) and corrosive due to the presence of salt water is shown. Sub-enclosure A 31 contains components which are least sensitive to the maritime environment and could be placed (nearly) anywhere on the host platform such as a seed pulse generator and pump lasers. Sub-enclosures B 33 and C contain components with are increasingly sensitive to humidity and/or saltwater incursion such as pulse pre-conditioning system, beam conditioning system, pulse stretcher, pulse compressors, pulse pickers, and beam delivery systems. Sub-enclosure B 33 would require placement in an area of the host platform that is well protected from the exterior environment, but would not require additional climate control features. Sub-enclosure C 35, on the other hand, contains the most sensitive components and would require a separate, climate controlled (e.g., MECU/S-C 36), and most possibly a hermetically sealed enclosure such as pulse amplifiers. Sub-enclosure D can be in yet another category of enclosure that is different than sub-enclosures A, B, and C. Sub-enclosure D, for example, may also need to be protected from Electromagnetic Interference (EMI) in addition to being in a controlled temperature and humidity environment (e.g., with MECU/S-D 40). Each sub-enclosure can be co-located with other types of equipment with compatible environmental requirements so that separate or additional environmental control and protection systems do not have to be created specifically for a laser system or its sub-components. (e.g., using existing environmental control and protection systems such as maritime ECU/S (MECU/S)-A 32, MECU/S-B 34, MECU/S-C 36, MECU/S-D 40 already in place to support the other types of equipment)

In one example referring to FIG. 2A, sub-enclosure A could be placed on the deck of a ship within a container that provides minimal environmental controls (i.e. a closed container with nominal heating/cooling, e.g., existing MECU/S-A 32). Exemplary sub-enclosures B and C could be placed below the deck in a climate controlled location (climate or environmentally controlled by or from existing MECU/S-B 34), with exemplary sub-enclosure C further requiring a room that has dry air (e.g., climate or environmentally controlled by or from existing MECU/S-C 36)—such as the compartment that contains sensitive communications equipment. Exemplary sub-enclosure B could also need to be in a compartment that has access to the deck of the ship so that the laser can be routed to the external beam director. Finally, exemplary sub-enclosure D would need to be placed in an interior space with climate control and EMI shielding (e.g., climate or environmentally controlled by or from existing MECU/S-D 40).

Other variants can include aircraft configurations, other vehicles, spacecraft, etc with different compartments with different environmental conditions, size constraints, electrical, or other design constraints. Components and subsystems with few requirements and environmental issues are separated from those with much more challenging requirements. Lightweight materials can be used where appropriate without endangering performance.

Figure 2B:
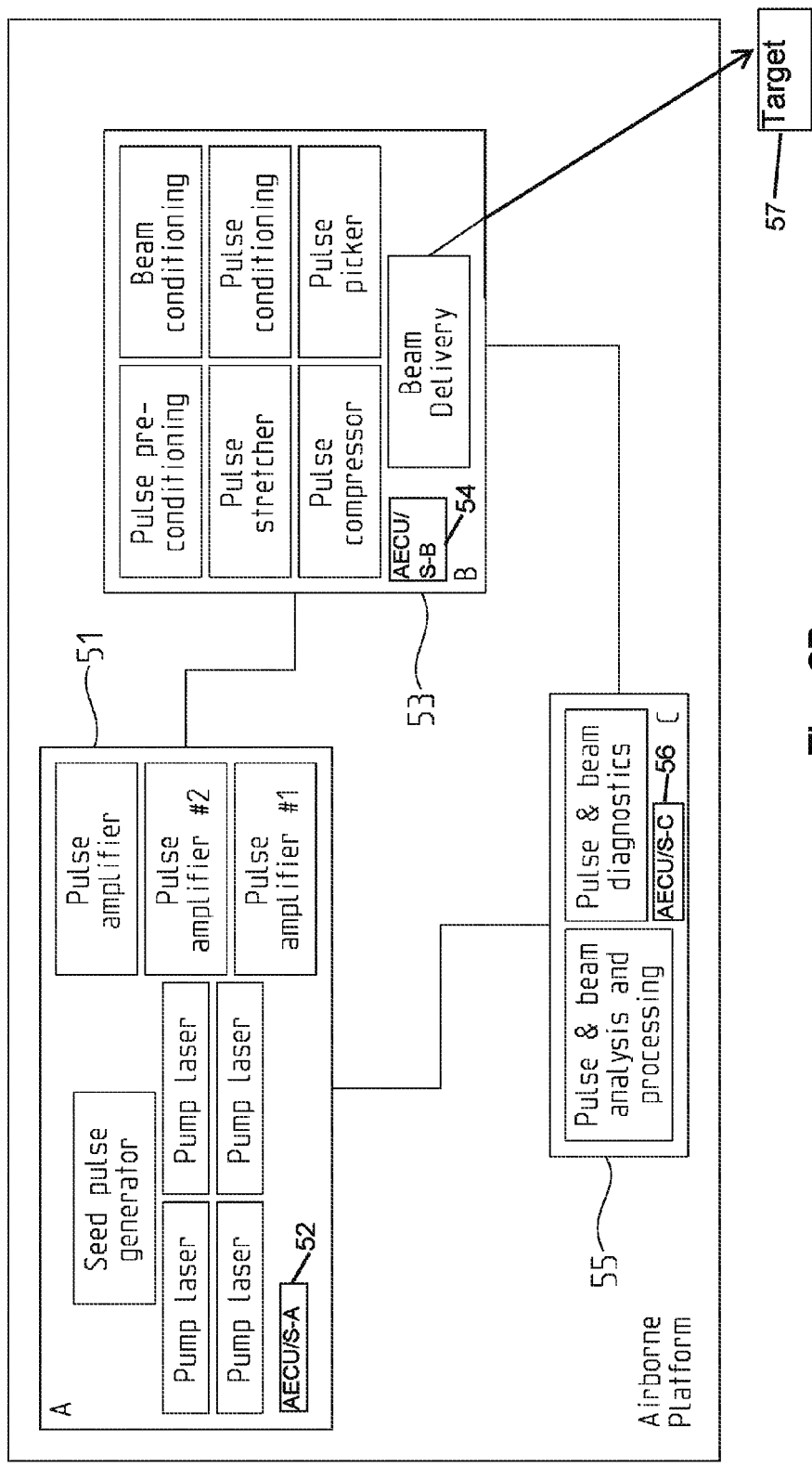
FIG. 2B shows another graphical representation of a second host platform such as such as an aircraft instrument bay where the aircraft has multiple sections and environments and the embodiment is disposed within a first environment that has a relationship to a crew or passenger compartment.

FIG. 2B shows another example of a variation of including an airborne platform. In particular, FIG. 2B shows an airborne platform configuration where, in this one example, environmental conditions may not be a primary constraint, but where size constraints are a strong driving factor in the overall aircraft-laser system integration and design. As such, preferred laser components for available and constraint compatible sub-enclosure A are amongst the smallest and can be placed in the most size constrained space. Preferred laser components for available and constraint compatible sub-enclosure B can take up significantly more space than those in sub-enclosure A, but still have functional inter-relationships which would make their co-location suitable and promote design efficiencies. Finally, preferred laser components for available and constraint compatible sub-enclosure C are similar to those in sub-enclosure B, but do not have the same functional inter-relations as the B sub-enclosure components, or have special EMI constraints which limit the locations in which it may be placed. Elements within sub-enclosure C can be separated into a third sub-enclosure or, if sufficient space is available and sufficient EMI shielding is present in sub-enclosure B, co-located with sub-enclosure B components.

In one example referring to FIG. 2B, exemplary sub-enclosure A items could be placed within the cargo hold of an aircraft—a space that provides minimal environmental controls (e.g., a closed container with nominal heating/cooling, e.g., climate or environmentally controlled by or from existing airborne ECU/S (AECU/S)-A 52). Exemplary sub-enclosures B and C items could need to be placed within a crew compartment where a climate controlled environment exists (e.g., climate or environmentally controlled by or from existing AECU/S-B 54). Exemplary sub-enclosure C items could need to be placed in a crew-suitable space with climate control (e.g., climate or environmentally controlled by or from the AECU/S-B 54) and EMI shielding (e.g., climate or environmentally controlled by or from existing AECU/S-C 56).

In some embodiments, by separating the components and subsystems and packaging them into modules such that those with similar environmental dependencies and/or requirements for proximity to other systems are housed together, significant weight and size efficiencies can be realized. In addition, via the use of distributed apertures of the laser pumps and amplifier systems, the weight of the overall system can be distributed throughout the host platform. This advantage can be made possible through the use of electronic and fiber optic connections.

Other possible embodiments for a host platform configuration in accordance with an embodiment of the invention can include a fixed location such as a tower or a building where all elements of an exemplary system are collocated in a single environment.

An embodiment of the invention can include a design and manufacturing process. Step 101: provide a laser system comprising a plurality of components. Step 103: determine temperature failure thresholds for each of said plurality of components and sizes for each component. Step 105: identify a platform to install said laser system on where the platform includes multiple compartments having different available installation areas/considerations and different environmental control systems or configurations configured to maintain a different temperature range in at least two of the different compartments wherein said different temperature range comprises a first and second temperature range. Step 107: identify said components having said failure thresholds lower than said first temperature range's highest temperature and group into a first component group as well as other installation constraints comprising size of available compartments, availability of ability to route equipment needed to connect laser system components, availability of existing structures such as bus, electrical sources, etc which could be dual-utilized for laser component needs, etc. Step 109: identify said components having said failure threshold lower than said second temperature range's highest temperature, and optionally ability to ensure a selected compartment's constraints is compatible with said components, and group into a second component group. Step 111: identify said components having said failure threshold higher than said second temperature range and optionally ability to ensure a selected compartment's constraints is compatible with said components, and group them into a third component group. Step 113: position said first component group components into said first compartment, said second group components into said second compartment, and said third group components into said third group compartment. The first group comprises diodes, the second group includes at least some of the laser system's electronics, the third group includes at least some fiber optics components. In this method, the platform can be an aircraft, the first compartment includes a passenger or a pilot control section, the second compartment comprises electronic equipment, and the third section comprises an area configured to carry cargo but not passengers or an aircrew resource area.

Although the invention has been described in detail with reference to certain preferred embodiments, variations and modifications exist within the spirit and scope of the invention as described and defined in the following claims. One alternative use includes a non-ultra-short pulse laser system that may also benefit from the modular distributed aperture design concept and architecture.

The invention claimed is:

1. A system with a modular laser system comprising:
   the modular laser system comprising a plurality of component groups, comprising a first, second, and third group, each group having components that fall within a first, second and third temperature induced equipment malfunction range;
   a host platform comprising multiple compartments comprising a first, second, and third compartment; and
   an environmental control system, wherein said environmental control system maintains a first environment in said first compartment and a second environment in said second compartment, wherein said first equipment malfunction range falls outside said first environment, wherein said second equipment malfunction range falls outside said second environment, wherein said environmental control system does not control temperature in said third compartment.

2. The system as in claim 1, wherein said platform is an aircraft and said first compartment further comprises a passenger or a pilot control section, said second compartment comprises electronic equipment with a higher degree of environmental sensitivity than said components in said first equipment group, and said third section comprises an area configured to carry cargo but not passengers or an aircrew resource area.

3. The system as in claim 1, wherein said platform is a ship, wherein said third group items are placed or installed within said third compartment on the deck of the ship comprising a moveable or fixed container that provides a fewest or lowest environmental controls compared to other said compartments, wherein said first group items are placed into said first compartment which has additional environmental controls than said third compartment, wherein said second group items are placed into said second compartment further requiring additional environmental controls than said first or third compartments.

4. The system as in claim 1, wherein said first or second compartment are configured with an access structure to and external surface of the platform so that the laser can be routed to an externally mounted beam director.

5. The system as in claim 4, wherein said external surface is the deck of the ship.

6. The system as in claim 1, further comprising a fourth compartment having electromagnetic shielding and more climate control equipment than said third compartment, wherein said plurality of components further comprise a fourth group, said fourth group items are placed into said fourth compartment have a first sensitivity to external electromagnetic radiation from a predetermined electromagnetic radiation interference source, wherein said fourth compartment is located within a ship structure.

7. The system as in claim 1, wherein said first compartment comprises a closed container with no or a fewest heating and cooling equipment items as compared to said second and third compartments.

8. The system as in claim 1, wherein said second compartment environmental controls further comprise environmental control equipment to produce dry air within said second compartment, wherein said second group items comprises electronics items having more environmental sensitivity constraints than said first or third group items.

9. The system as in claim 1, wherein said plurality of components are further selected for first, second, or third groups based on space availability of said compartments wherein a compartment is not selected if a respective component has a size which does not fit into an available mounting space within one of said compartments.

10. A platform as in claim 1, wherein said plurality of components are further selected for placement into said first, second, or third groups based on interconnection requirements between said components.

* * * * *